Oct. 3, 1939.  B. A. PROCTOR  2,174,529
PHOTOGRAPHIC APPARATUS
Original Filed April 30, 1927   2 Sheets-Sheet 1
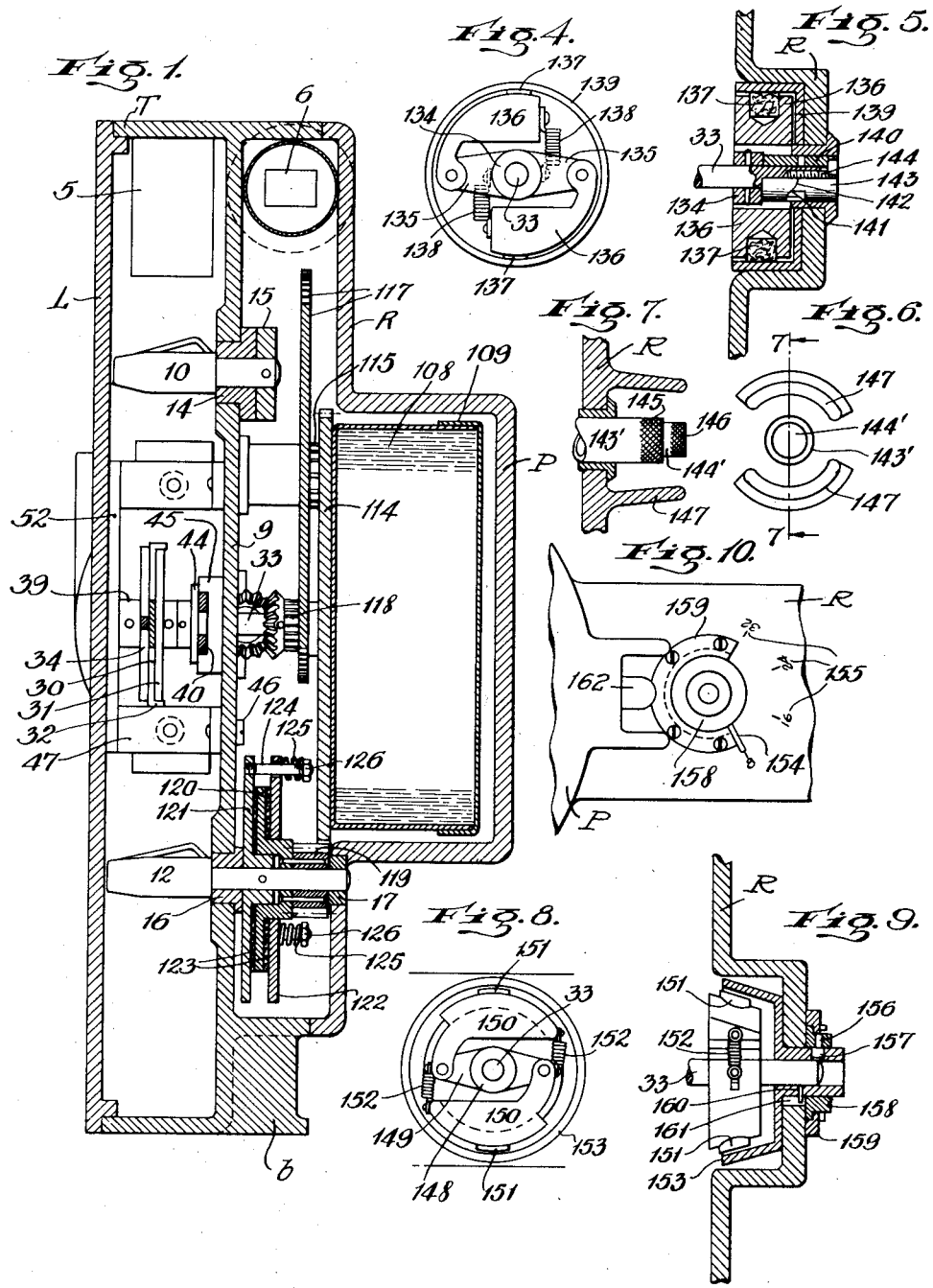
INVENTOR
BARTON ALLEN PROCTOR
BY
ATTORNEY Oct. 3, 1939.　　　　B. A. PROCTOR　　　　2,174,529
PHOTOGRAPHIC APPARATUS
Original Filed April 30, 1927　　2 Sheets-Sheet 2
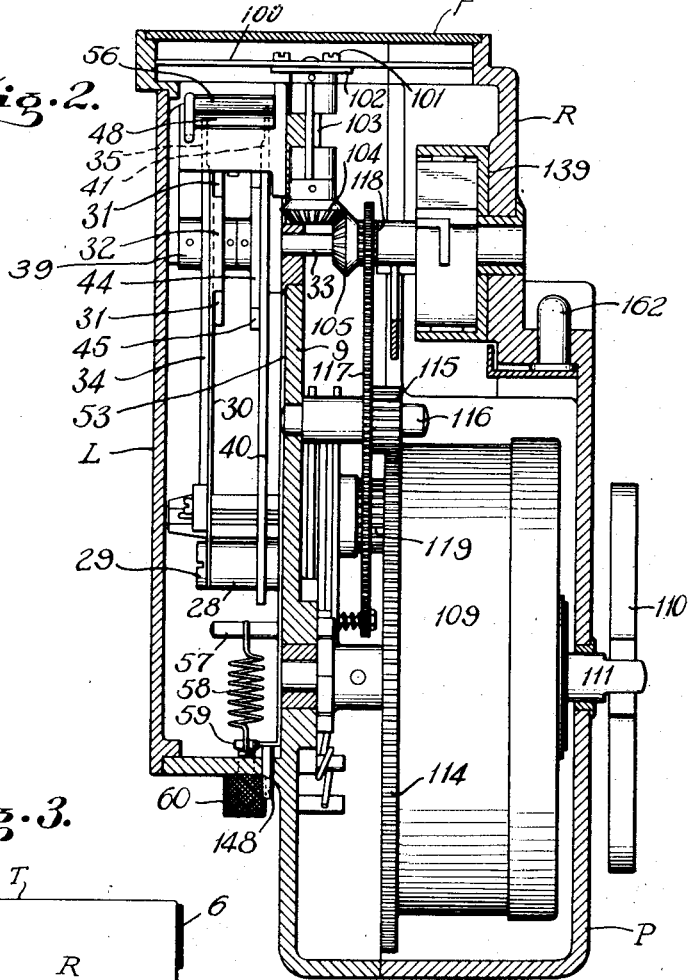
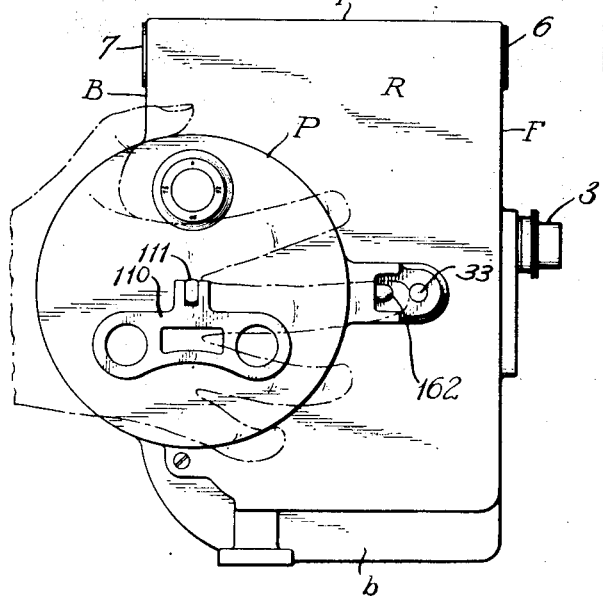
INVENTOR
BARTON ALLEN PROCTOR
BY
ATTORNEY Patented Oct. 3, 1939

2,174,529

UNITED STATES PATENT OFFICE 2,174,529

PHOTOGRAPHIC APPARATUS

Barton Allen Proctor, Larchmont, N. Y., assignor to Kinatome Patents Corporation, a corporation of New York Original application April 30, 1927, Serial No. 187,980, now Patent No. 1,944,033, dated January 16, 1934. Divided and this application January 6, 1934, Serial No. 705,545

11 Claims. (Cl. 88—17)

The present invention relates broadly to the art of photography, and more particularly to improvement in apparatus adapted for the taking or projection of pictures, but it will be readily understood that it is applicable to many other uses.

This application is a division from my copending application which has matured in United States Patent Number 1,944,033 dated January 16, 1934.

My parent invention provides simple and effective means for the automatic threading of photographic apparatus without the laborious and difficult manipulation which is required by previous types of projectors and cameras. In apparatus constructed according to my parent invention, the user merely places the film in the gate of the apparatus, and the mechanism itself correctly and without damage to the film positions it both in the focal plane of the lens and laterally and also in cooperative relationship with the driving means, and automatically creates and maintains the conditions of tension which are necessary for proper operation.

My parent invention contemplates the use of improved film feeding means and film retaining means preferably in the form of teeth cooperating with a film in the gate in order to give to the film the required intermittent movement to bring successive portions into operative position, and to hold the film definitely in proper registration for exposure or projection.

In my parent application, the arrangements and combinations of the operable parts are disclosed with particularity and claimed both broadly and specifically. In the present application, advantageous constructional features of the casing for the operable parts of the apparatus and certain cooperative arrangements of the casing and certain operable parts are claimed. One of such features relates to the advantageous use of a firmly mounted web or plate which divides the casing into two compartments and also serves as a rigid frame for mounting thereon revoluble parts of the apparatus so as to secure quiet and accurate operation and economical construction. Another of such features relates to the arrangement of the external surface of the casing so that a projection on a side of the casing for receiving therein the usual spring for driving the apparatus may also serve as a convenient hand piece for an operator to hold the apparatus with his right hand while taking motion pictures. Also, a movable control member which is operable to start and stop the apparatus inside the case projects through the above noted spring receiving projection at a convenient point so that an operator with one hand can hold the casing securely, and with one of the fingers of this hand can conveniently operate the above noted controlling member for starting and stopping the spring driven parts inside the casing.

Another of such features relates to the positioning in one of said compartments of only such operable parts of the apparatus to which the user ordinarily needs to have access, for example, the spindles and the gate; and positioning in the other compartment such operable parts as the user need never see while the apparatus is operating satisfactorily. The operable parts placed in the last named compartment are preferably constructed with oil-less bearings and ordinarily need no lubricating by the user. This compartment is closed, however, to be readily opened when access to the parts therein is required.

Another of the features of the present invention resides in the provision of a mounting plate or web disposed intermediate the side walls of the casing and integrally joined to the top, bottom, front and rear walls to be braced and stiffened thereby, and in turn greatly strengthening the casing as a whole. This central member is preferably in the form of an I, thus materially strengthening the construction, all of the essential operable parts of the apparatus being initially assembled upon this I structure.

In the accompanying drawings, there is illustrated a casing which is especially designed for use by a right-handed operator. It can be readily seen by those skilled in the art that a suitable casing for use by a left-handed operator can be easily constructed according to the present invention.

An object of the present invention is the provision of an improved case or housing for a motion picture camera which includes firm and rigid means for mounting the operable parts of the camera, which also serves to divide the case into suitable compartments.

Another object of the invention is the provision of a case for a motion picture apparatus which can be conveniently held and operated by one hand of an operator.

Another and important object of the invention is the provision of a case for a motion picture apparatus which case has improved means for facilitating the assembly of the operable parts of the apparatus in the case.

Another object of the present invention is to provide an improved governor means for a driven motion picture camera. A further object of the present invention is to provide a governor device for a power driven motion picture apparatus which can be easily adjusted for varying the rate of movement of the film as it is fed through the apparatus. This governing element preferably has features especially co-operating with the casing and web to which reference has previously been made.

Other features and advantages of the invention will appear hereinafter as the disclosure proceeds.

Other advantages, objects, and characteristics are apparent from the following description, the attached drawings and the subjoined claims. Although I am showing one preferred embodiment of my invention, it will be readily understood that I am not limited to this particular construction as changes can be readily made without departing from the spirit of the invention or the scope of my broader claims.

It will be readily understood by those skilled in the art that my invention applies to photographic apparatus generically and equally well to either a projector or a camera, although in the following description, I give as an example of my invention its embodiment in a camera.

In the drawings:

Figure 1 is a rear elevational view of the apparatus broken away in part to better disclose the use of the web member of the case as a mounting frame and for dividing the casing into two main compartments;

Figure 2 is a top view of the apparatus, broken away and sectional;

Figure 3 is a right side elevational view of the apparatus illustrating how an operator can conveniently hold it in one hand and control the operation of the apparatus with a finger of the same hand which holds it;

Figure 4 is a side elevational view of one form of the governor, and Figure 5 is a sectional elevation of the same;

Figure 6 is a view of a modified form of governor adjusting means in which the control and actuating members are prolonged, and Figure 7 is a cross section of the same, taken along the line 7—7 of Figure 6;

Figure 8 is a view of an alternative governor mechanism in which the governor cone is bodily shifted to change the speed of rotation, and Figure 9 is a sectional elevation of the same;

Figure 10 is a side view of a portion of the apparatus showing the control button and the calibrated means for changing the rate of rotation of the main operating shaft by the shifting of the governor cone shown in Figure 9.

In carrying out the present invention, there may be provided a casing of suitable construction which, for purposes of description hereinafter will be referred to as having a front wall F, a back wall B, a top wall T, a right hand side wall R, and a left hand side wall L. These various walls may all be carried by or integral with a base b of suitable construction.

On the front wall F of the casing as clearly shown in Figures 2 and 3 of the drawings, is a usual lens assembly 3 which is in line with and directly in front of the aperture of a gate structure later described. In the top portion of the casing, immediately above the lens, there may be provided the usual brilliant finder 5 (Figure 1). To the right of the brilliant finder as viewed in this figure, there is mounted in the front wall F the forward optical element 6 of a telescopic view finder, while in the back wall B is mounted the rear optical element 7. It will thus be seen that the casing itself serves as the body of the telescopic finder thereby making it unnecessary to provide any special lens tube exteriorly of the casing. A bottom wall b may be provided in usual manner with suitable means whereby the casing may be effectively carried by a suitable support such as a tripod.

Within the casing is a vertically extending web 9. This web extends substantially parallel to the two side walls and has mounted therein adjacent its upper portion, a spindle 10 adapted to receive a usual supply or delivery reel while in its lower portion it carries a second spindle 12 adapted to receive a usual takeup reel. The spindle 10 may rotate freely in a bushing 14 in a thickened boss portion of the web 9, the parts being held in the desired position by a collar 15. A similar bushing 16 mounted in a thickened boss portion of the web 9 may be provided for the intermediate portion of the spindle 12, the outer end thereof being mounted in a second bushing 17 in the side R of the casing. The film in passing from the supply reel to the take-up reel preferably passes over tension pads as taught in my parent application.

The method of operation of the tension arms is set forth in my parent application and in the copending joint application of Clarkson U. Bundick and myself Serial Number 44,482, filed July 18, 1925, which on January 16, 1934, matured as United States Patent Number 1,944,022 and it is not deemed necessary to repeat such explanation here. It will be understood by those skilled in the art, that the structure of the present invention may be used with motion picture apparatus which uses continuously operating delivery and take-up sprockets employing conventional loops of slack film.

Carried by the web 9 at a point generally intermediate the spindles 10 and 12 is a pin 28 which carries in the form of a screw 29 a pivotal mounting for a plate 30 extending forwardly from the scerw 29 toward the lens. The plate 30 is arranged for oscillating movement in a vertical direction under the influence of a cam 31 the periphery of which bears against projections 32 on the plate 30. The cam 31 is suitably pinned to a main operating shaft 33 extending transversely through the web 9 and projecting beyond opposite sides thereof. Riding upon the plate 30 is a second plate 34 the outer end of which is shaped to provide teeth or fingers 35 effective for engaging in usual perforations in the film in order to pull the film down after each exposure. The particular construction of the plate 34 and fingers thereon may be the same as shown in my parent application. The plate 34 may also carry means for cooperation with a cam 39 mounted on the shaft 33 for rotation therewith for imparting an in-ond-out movement to the plate 34 in timed relation to the up-and-down movement of the plate 30 imparted by the cam 31. The cam which operatively moves the film feeding fingers of this apparatus occupies such relative positions that the plate 34 is urged forwardly during the time the plate 30 is stationary. This arrangement permits the teeth on the plate 34 to be moved forwardly into engagement with the perforations in the film while the film is still engaged by and held stationary by retaining fingers 41 on a film retaining plate 40. This plate 40 is moved in and out by a cam 44 and cam follower 45 constructed as shown in my parent application. The operation of all the feeding means elements of the present invention is fully set forth in my parent application and it is not deemed essential to an understanding of the present invention to repeat the explanation of the feeding means.

The gate construction which I prefer to use with the present invention, and through which the film passes in position to be engaged by the fingers 35 and 41, heretofore referred to, may be the same as described in my parent application, and include a relatively fixed gate section 48 and a movable gate section 56. For cooperation with the gate there may be provided finger means as shown in my parent application and in my copending application which matured on January 16, 1934, as United States Patent Number 1,944,037 for moving the film laterally into position in the gate. Such lateral film moving means form no part of the present invention and it is not considered essential to an understanding thereof specifically to describe them herein. For opening and closing the gate by moving the movable gate section relatively to the fixed gate section, a light flat control plate 53 extends from a connection with the front or movable gate section 56 rearwardly along the adjacent surface of the web 9 and has mounted therein a pin 57 to which is attached one end of a spring 58. The other end of the spring 58 may be fastened to an adjusting screw 59 which extends through a portion of the wall of the casing to receive an adjusting nut 60. It can be readily seen by inspection of Figure 2 that the pressure of the gate sections may be easily adjusted by manipulating the nut 60. In order to provide for releasing the pressure of the gate sections upon a film at any time as for such reasons set forth in my parent application, the control plate 54 has a portion bent transversely thereto at its rear end and to this portion is fastened a pin 148 which projects through an opening in the wall of the casing a short distance outwardly therefrom.

In accordance with the usual practice, I may provide a shutter 100 attached in any desired manner, as for example, by means of screws 101 to a plate 102 suitably secured to a shaft 103. This shaft may be mounted in any desired manner, as on bearings (not shown) secured to the web 9. The shaft 103 may be driven by the provision of a bevelled gear 104 fastened thereto and meshing with a similar gear 105 on the transversely extending main operating shaft 33. The shutter may be provided with an opening as is conventional in the art of such size as properly to adapt it to the speed of operation of the feeding mechanism as determined by the characteristics of the cams and driving means utilized therefor. A suitable opening through which the shutter revolves may be provided in the web 9.

The power mechanism for the apparatus preferably comprises a spring 108 mounted within a suitable casing 109 on the right hand side of the apparatus. For winding the spring, there may be provided a key 110 of suitable construction operable for winding purposes in a clockwise direction as viewed in Figure 2. This effects rotation of the shaft 111 on which the winding key is suitably mounted, reverse rotation of the shaft 111 being prevented by suitable ratchet mechanism which may be arranged as disclosed in my parent application. As the spring tends to unwind in normal manner, it effects counter-clockwise rotation of the driving gear 114 attached to the spring housing and directly meshing with a gear 115 keyed to the shaft 116 preferably extending transversely of the casing and being supported by the web 9. Operation of the gear 115 serves to drive the gear 117 suitably secured thereto and meshing with a spur gear 118 on the transverse main operating shaft 33 before referred to.

The gear 114 also meshes with a small gear 119 effective for driving the take-up spindle 12 through a suitable friction drive mechanism. This mechanism may be constructed as disclosed in my parent application.

It is desirable to have means observable from the outside of a light tight casing of a motion picture camera which will indicate whether or not the apparatus is functioning normally. The provision of such means is a feature of the present invention and according to a preferred form of such means, an indicator member is arranged in conjunction with means for controlling the speed of the apparatus. In order to control the speed of operation of the apparatus, there is conveniently provided a governor attached directly to the main operating shaft 33, which, as later described, extends outwardly of the casing. According to one embodiment of the invention, the desired control may be effected by a mechanism of the character shown in Figures 4 and 5. This mechanism includes a collar 134 secured to the shaft 33 from which project radially extending arms 135. Each of these arms has pivotally attached thereto, a governor element 136 carrying suitable friction pads 137 adapted as the governor elements are thrown outwardly against the action of the springs 138 to engage the governor cup 139. This cup is preferably mounted on the casing in any desired manner to prevent rotation relatively thereto.

With such a construction, it will be apparent that the tension exerted by the springs 138 is effective to vary, i. e., control the pressure of the governor elements against the governor cup 139 because of the centrifugal movements of these elements. In order to permit adjustments of these springs, the inner ends are preferably attached to a sleeve 140 rotatable on the shaft 33. The outer end of the sleeve 140, comprising the right hand end as viewed in Figure 5, is preferably formed with at least one inclined face 141 adapted to cooperate with a similarly inclined face or faces 142 on a second sleeve 143 movable axially of the shaft 33 and adjustable by means of a screw 144.

By reason of this construction, it will be apparent that as the screw is adjusted inwardly it will effect rotation of the sleeve 140 in such manner as to increase the tension on the springs 138, while if the screw 144 is moved in the opposite direction the tension on the springs will be relieved.

According to one embodiment of the invention, the sleeve 143' of Figure 7, corresponding to the sleeve 143 before described, may be extended outwardly from the casing and provided with a knurled surface 145. The screw 144', which corresponds to the screw 144, may likewise be carried outwardly and provided with a knurled portion 146 whereby adjustment of the governor adjusting parts is facilitated. Accidental relative movement between these parts, as well as injury to the operator, may be obviated by the provision of a protective guard 147. Such a construction is desirable in certain cases as it permits the operator to rotate the main shaft 33 by hand by engagement with the knurled surface 145. Also, the sleeve 143', projecting as it does, is clearly visible to the operator at all times thereby enabling him to determine whether or not the apparatus is properly operating without opening the casing and damaging a light sensitive film.

In order to show the user of a camera how much film he has exposed at any time, a film meter such as that shown in my parent application or any other suitable type of film meter may be mounted on a wall of the casing of the present invention for cooperative movement with the spring casing 109.

According to another embodiment of the invention, the governor mechanism is so constructed that regulation thereof may be effected without the movement of any revoluble part of the governor device per se. Such a modified construction is shown in Figures 8 and 9 in which there is shown secured to the shaft 33 a collar 148 carrying arms 149 to which are secured governor elements 150 provided with friction inserts 151 similar to the inserts 137. These elements are in turn controlled by tension springs 152. Cooperating with the governor elements is a conical housing 153 which may be shifted axially of the shaft 33. This axial adjustment may be effected by means of a lever 154 as shown in Figure 10, the lever 154 cooperating with suitable calibrations 155. Rotational movement of the lever 154 is transmitted to the cone 153 by means of a pin 156 lying within a spirally extending slot 157 in the hub of the cone. The pin 156 may be carried by a rotatable collar 158 held in place by a retaining member 159. The governor cone itself is held against rotation by means of a pin 160 projecting therefrom into a slot 161 in the casing of the apparatus. With such a construction, it will be apparent that movement of the cone inwardly and outwardly changes the distance through which the governor elements must move against the action of the springs 152 before the friction members carried thereby co-act with the cone. It will be understood that the greater the distance moved by the element 150 against the action of the springs 152 the more effective the springs become in reducing the pressure and the resulting friction of the inserts 151 against the governor cup. It can be readily seen that axial movement of the conical governor cup also increases or decreases the length of the work paths of the inserts 151 and thereby changes the speed controlling effect of the governor.

It can be seen from inspection of Figures 1 and 2 that the right side wall R includes a projecting portion P for receiving the driving spring mechanism 108. It can be further seen by inspection of Figure 3 that this projecting portion for receiving the spring mechanism is set intermediate the top and bottom of the camera case and is spaced considerably to the rear of the front side of the camera which carries the lens 3.

Extending through an opening provided in the front wall portion of the extension of the projecting portion P is a control member 162 which is adapted to be manually moved inwardly by the pressure of the operator's finger for starting and stopping the operation of the camera by means (not shown) which may be the same as are described in my parent application. It can be seen from inspection of Figures 3 and 10 that the projecting portion P and the control member 162 and the lever 154 are so positioned one relative to the other that an operator can conveniently support the camera for operating it by grasping the projecting portion P in his right hand, and also selectively operate the control member 162 and the lever 154 with his index or other desired finger on the same hand. It will be further seen that the finger which is used to operate the starting and stopping member 162 and the other fingers of the operator are positioned well to the rear of the lens 3 so that there will be no danger of the operator's fingers interfering with the view being photographed by the camera.

It can be further seen by inspection of Figures 1 and 2 that the web member 9 is so arranged that substantially all of the moving parts of the apparatus can be completely mounted on the web in positions to be easily accessible from either side of the web when the side walls R and L are removed. This is a great convenience in loading the camera and also in repairing and assembling the camera parts should such be necessary through accident or other cause. It will be further noted that the web 9 provides a firm and rigid bearing for the main rotating parts of the apparatus, such as the spindles 10 and 12 and the shaft 33. The spindle 12 may have an additional bearing element 17 engaging with a hole in the right side wall so positioned that the bearing 17 and the opening automatically coincide and engage one with the other when the right side wall R is assembled on the web. It will be noted from Figure 1 that the web member 9 is in effect, an I beam having a very desirable rigidity. This web member thus forms a large part of the casing, as well as supporting all of the essential operable parts of the apparatus, and is so shaped that it can be inexpensively manufactured.

Some of the advantages of the present invention appear from the statements of the specification hereinbefore. Other advantages arise from the provision of a light tight casing for motion picture apparatus having a gate with a movable section and means for adjusting said movable section as for passing thickened portions of the film from without said casing without opening the casing whatever. Other advantages arise from the provision of a light tight casing for a motion picture apparatus having means disposed exteriorly of said casing for indicating to the operator of the apparatus that it is operating normally. Other advantages arise from the provision of a strong, rigid inexpensive casing for an apparatus having rapidly moving parts which must operate very accurately.

I claim:

1. A compact self contained film handling apparatus comprising a central vertical web having flanges extending therefrom at right angles thereto from both surfaces thereof at the periphery of said web, said web forming a main supporting structure for said apparatus and said flanges together with two covering members adapted to cooperate therewith forming an internally stiffened housing including two compartments of which said web forms the central dividing wall in one of which compartments are disposed film supporting members in spaced parallelism to each other, a gate structure disposed between said members and supported by said web, and means adapted to feed a film from one of said supporting members through said gate to the other, said feeding means comprising a shaft supported by said web and extending therethrough and being disposed adjacent said gate and a film engaging member operated by said shaft and extending to a point within said gate for advancing the film, and in the other of which compartments are disposed a motor and a train of gears adapted to apply the power of said motor to said shaft and to one of said film supporting members.

2. A film handling apparatus comprising a central vertical web having flanges extending therefrom at right angles thereto from both surfaces thereof at the periphery of said web, said web forming a main supporting structure for said apparatus, said flanges together with two covering members being adapted to cooperate therewith forming an internally stiffened housing including two compartments of which said web forms the central dividing wall, in one of which compartments are disposed film supporting members in spaced parallelism to each other and means adapted to feed a film from one of said supporting members to the other, and in the other of which compartments are disposed a motor and a train of gears adapted to apply the power of said motor to said feeding means and to one of said film supporting members, said feeding means, said motor, and said last mentioned film supporting means including shafts supported by said web and one of said covering members.

3. A film handling apparatus comprising a substantially flat main supporting frame with right angle extensions to each surface thereof at the periphery of the same which together with two covering members adapted to cooperate therewith forms an internally braced housing including two compartments in one of which compartments are disposed a supply spindle, a delivery spindle, a gate, and means adapted intermittently to feed a film from said supply spindle through said gate to said take up spindle, and in the other of which compartments are disposed a motor and power transmitting means for driving said feeding and taking up means from said motor, one of said covering members including a main flat portion disposed parallel to said frame and a formation enclosed on its outer side and extending substantially therefrom at substantially a right angle thereto and adapted to enclose said motor, said means for transmitting power from said motor to said feeding and taking up means being disposed in the area between said main flat portion of said last mentioned covering member and said main frame, and said motor being supported upon a shaft extending between and supported by said main frame and a covering member fastened to one of said right angled extension thereto.

4. A compact self contained film handling apparatus comprising a central vertical web having flanges extending therefrom at right angles thereto from both of its surfaces along the periphery thereof, said casting together with two covering members adapted to cooperate therewith forming two compartments of which said web forms the central dividing wall in one of which compartments are disposed film supporting members in spaced parallelism to each other, a gate structure disposed between said members and supported by said web, and means adapted to feed a film from one of said supporting members through said gate to the other, said feeding means comprising a shaft supported by said web and extending therethrough and being disposed adjacent said gate, a member extending to a point within said gate structure for advancing a film therethrough, and cams disposed upon said shaft adjacent said web for operating said film engaging member, and in the other of which compartments are disposed a motor and a train of gears adapted to apply the power of said motor to said shaft and to one of said film supporting members.

5. In a motion picture camera, film feeding means, a spring motor for driving said feeding means, a structure enclosing said feeding means and said motor, said structure including a front portion and two side portions, a left hand portion and a right hand portion, an objective lens supported by said front portion and in alignment with a film fed by said feeding means, said left hand portion including an opening and a member movable to a position closing such opening and said right hand portion being formed with a substantially flat circular protuberance enclosing said spring motor and adapted to be grasped conveniently by an operator's right hand of normal size for the purpose of holding said camera, a control button disposed exteriorly of said casing at a point adjacent the periphery of said protuberance and adapted to be operated by a finger of such right hand of the operator, and an operating connection between said button and said feeding means whereby said feeding means is started or stopped thereby.

6. A case for a motion picture camera having a plurality of operable parts and a spring motor for driving the same, said case including a body portion normally disposed in a vertical plane for inclosing certain of said operable parts, said case further including a portion projecting from the right side of said body portion to provide a compartment in said case for receiving said spring motor, said projecting portion being of a size and shape to be easily grasped by a hand of the operator for supporting said camera in position for operating the same, one of said operable parts projecting forwardly through an opening in the wall of said compartment to be manually operated, said compartment wall having such an opening, the projecting portion of said operable member being positioned to be conveniently operated by one finger of the right hand of the operator when such hand grasps said projecting case portion for holding said camera in position for operating the same.

7. A case for a motion picture camera having a lens, a plurality of operable parts and a spring motor for driving the same, said lens being disposed at the front of said camera, said case including a body portion normally disposed in a vertical plane and enclosing certain of said operable parts, said case further including a portion projecting from the right side of said body portion to provide a compartment in said case for receiving said spring motor, said projecting portion being of a size and shape to be easily grasped by a hand of the operator for supporting said camera in position for operating the same, one of said operable parts projecting forwardly through an opening in the wall of said compartment to be manually operated, said compartment wall having such an opening, the projecting portion of said operable member being positioned to be conveniently operated by one finger of the right hand of the operator when such hand grasps said projecting case portion for holding said camera in position for operating the same, said projecting portion being positioned intermediately the top and bottom edges of said camera and said opening for said operable part and disposed materially in the rear of the front of said camera out of the way of said lens.

8. A case for a motion picture camera, a plurality of operable parts and a spring motor for driving the same, one of said operable parts including an adjustable governor and a control member for adjusting said governor, said case including a body portion normally disposed in a vertical plane and enclosing certain of said operable parts, said case further including a portion projecting from the right side of said body portion to provide a compartment in said case for receiving said spring motor, said projecting portion being of a size and shape to be easily grasped by a hand of the operator for supporting said camera in operative position, two of said operable parts having portions projecting forwardly through openings in the wall of said compartment to be manually operated, one of said two operable parts including said control member for said governor, said compartment wall having openings for said projecting portions, said projecting portions being positioned to be conveniently operated by one finger of the right hand of the operator when such hand grasps the spring-receiving case portion for holding said camera in position for operating the same, said projection being positioned intermediate the top and bottom edges of said camera and said openings for said projecting portions being disposed in such relation, one to the other, and to said spring-receiving case portion that one finger of the operator's hand may conveniently reach both of said projecting portions.

9. A case for a motion picture camera having a plurality of operable film moving parts and a spring motor for driving the same, said case including a body portion normally disposed in a vertical plane and inclosing certain of said operable parts, said case further including a portion projecting from the right side of said body portion to provide a compartment in said case for receiving said spring motor, said projecting portion being of a size and shape to be easily grasped by a hand of the operator for supporting said camera in position for operating the same, one of said operable parts projecting forwardly through an opening in the wall of said compartment to be manually operated for moving the film, said compartment wall having such an opening, the projecting portion of said operable member being positioned to be conveniently operated by one finger of the right hand of the operator when such hand grasps said spring-receiving case portion for holding said camera in position for operating the same, said projecting portion being disposed approximately midway between the top and bottom of the camera and adjacent the rear thereof.

10. In a film handling apparatus, a casing effective for protecting a film therein from the action of light, film feeding and guiding mechanism disposed within said casing, powered means normally effective for driving said feeding mechanism, means for governing the speed of operation of said feeding mechanism, said feeding mechanism including a toothed member and a shaft for operating said member, said shaft extending to a position exterior of said casing, the portion of said shaft thus exposed being effective for indicating whether or not said film feeding means is operating properly and being operable for the manual feeding of the film through the apparatus alternatively to the operation thereof by said powered means, means for adjusting the operation of said governing means, and a manually operable control member for said adjusting means extending to the exterior of said casing adjacent said external portion of said shaft whereby said two manually operable means are conveniently disposed in relation to each other.

11. In a photographic apparatus, a film moving mechanism, said mechanism including a revoluble shaft, a motor for driving said shaft, and a governor controlling the speed of said mechanism, said governor comprising a yoke attached to and revoluble with said shaft, governor elements attached to the outer ends of said yoke and adapted to be moved away therefrom by the revolution of said yoke, a braking surface of uniform diameter against which said governor elements impinge, a sleeve attached to and revoluble with and relatively to said shaft, said sleeve having an inclined face, springs for resisting the movement of said governor elements away from said shaft, one end of each of said springs being attached to said sleeve and the other end to said yoke, a second sleeve with an inclined face for cooperation with the inclined face of said first sleeve surrounding said shaft but fixed in relation thereto, and means for moving said second sleeve so that said inclined face thereof coacts with the inclined face of said first sleeve to rotate said first sleeve thereby changing the effectiveness of said governor.

BARTON A. PROCTOR.